(No Model.)
J. M. WADLINGTON & D. GRACE.
RUNNING GEAR FOR WAGONS.
No. 248,813. Patented Oct. 25, 1881.
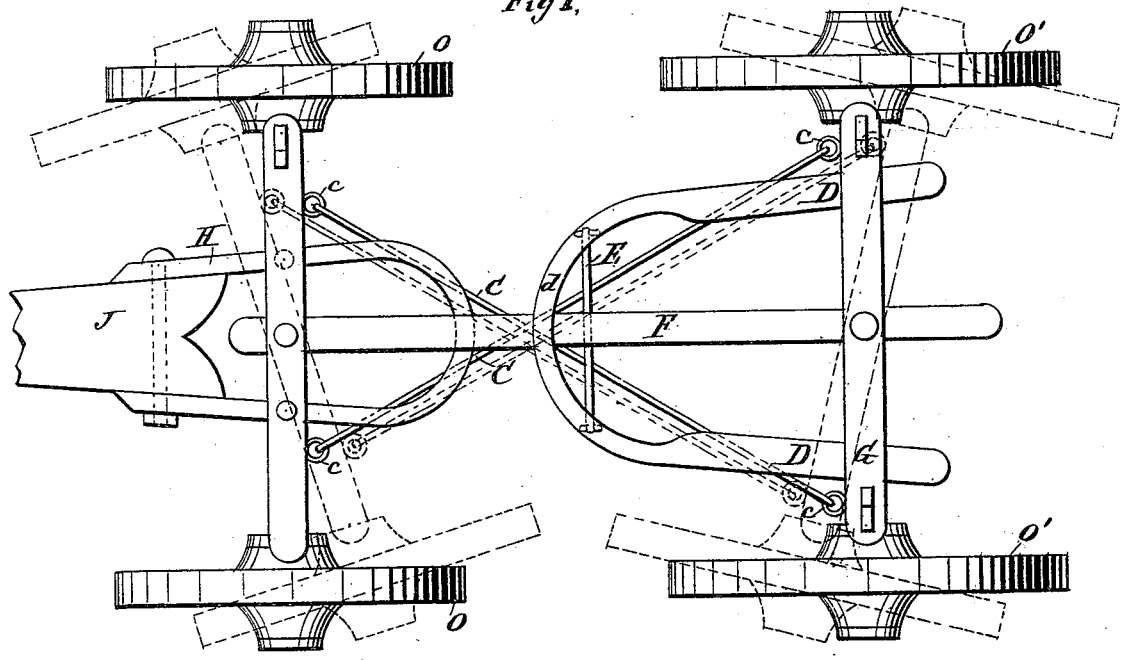
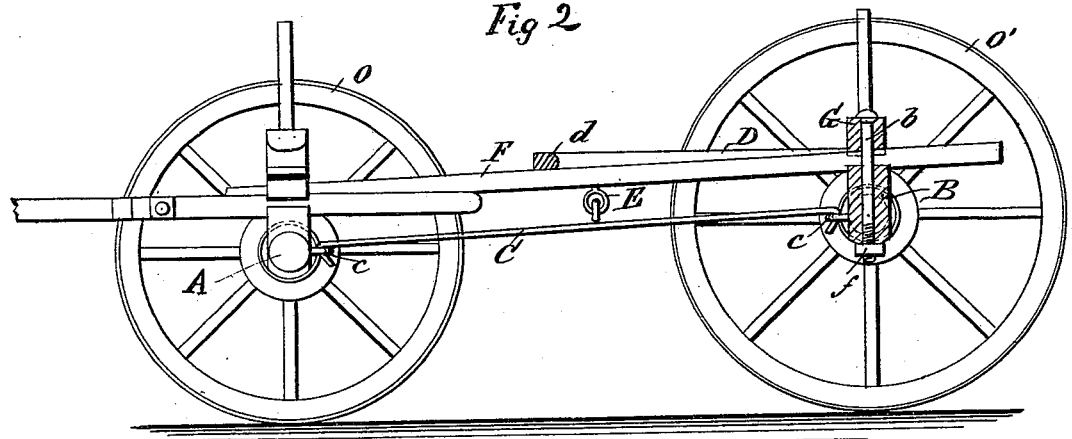
WITNESSES:
C. Sedgwick
J. H. Scarborough
INVENTOR:
J. M. Wadlington
D. Grace
BY Munn & Co
ATTORNEYS.

United States Patent Office.

JOHN M. WADLINGTON AND DANIEL GRACE, OF ST. JOSEPH, MISSOURI.

RUNNING-GEAR FOR WAGONS.

SPECIFICATION forming part of Letters Patent No. 248,813, dated October 25, 1881.

Application filed March 28, 1881. (No model.)

*To all whom it may concern:*

Be it known that we, JOHN M. WADLINGTON and DANIEL GRACE, of St. Joseph, in the county of Buchanan and State of Missouri, have invented a new and useful Improvement in Wagons, of which the following is a specification.

Figure 1 is a plan view; Fig. 2, a longitudinal sectional elevation.

Similar letters of reference indicate corresponding parts.

Our improvement refers more particularly to that class of wagons in which both forward and hind axles are pivoted at their centers and connected by cross rods or chains; and it consists in providing a wagon having said pivoted axles and connecting cross-rods with hind hounds extending forward for some distance from the rear axle, to which they are attached, said hounds carrying a cross stop-rod, which acts, in combination with the reach, to limit the movement of the axles and to prevent any rising of the rear hounds from the reach.

The drawings show a wagon with forward axle, A, and hind axle, B, connected by the reach F and by cross rods or chains C, which are loosely fastened by ring-bo'ts c, or other suitable means, to opposite sides of the front and hind axles. The front hounds, H, and a portion of the wagon-tongue J are also shown. The hind hounds, D, are rigidly attached to the hind axle, B, and extend some distance forward, as at d, where the stop-rod E is attached, which rod serves the following purposes: first, it acts on either side of the reach F, on the swinging of the hind axle, B, on its pivot-bolt b, to limit the swinging movement of the hind axle, B, and wheels O', and prevent the contact of O' with the body of the wagon, and through the medium of the connecting rods or chains C C the swinging movement of the forward axle, A, and wheels O are likewise limited and the contact of O with the wagon-body also prevented; and, second, it acts, in combination with the reach F, to insure the swinging of the hind axle, B, in a horizontal plane. To secure the latter object the stop-rod E acts upon or against the under side of said reach F. The hounds D afford a firm bearing or seat for the hind bolster, G. The extension d of the hounds D (shown with curved forward end) may have square forward end, if desired. The method of connecting the hind bolster, G, reach F, and hind axle, B, by the pivot-bolt b and nut f, is shown in Fig. 2. By shortening or lengthening the stop-rod E the swinging movement of the wheels can be regulated as desired, so as to move through a shorter or longer minimum curve.

The dotted lines in Fig. 1 show the relative positions of the wheels O O', axles A B, and connecting rods or chains C C while turning the wagon.

The above construction and arrangement of parts act to distribute the shocks caused by travel over ruts and rough roads through all parts of the running-gear of a wagon, and the ordinary violent jerking action of its shaft or pole connections is greatly lessened and the labor of the draft-animals made lighter in consequence. The wagon can also be turned around short curves with ease and certainty of movement.

Having thus fully described our invention, we claim as new and desire to secure by Letters Patent—

In combination with the axles A B, connected by cross rods or chains C C, the hounds D, having extension d, and stop-rod E, substantially as and for the purposes herein specified.

JOHN MAHLON WADLINGTON.
DANIEL GRACE.

Witnesses:
WILLIAM A. SOUTHWORTH,
THOMAS WESLEY WILSON.